3,188,345
B-HALO PHOSPHINE BORINES

Anton B. Burg, Los Angeles, and Ross I. Wagner, Whittier, Calif., assignors to American Potash & Chemical Corporation, Los Angeles, Calif., a corporation of Delaware
No Drawing. Filed Nov. 2, 1959, Ser. No. 850,063
1 Claim. (Cl. 260—543)

This application is a continuation-in-part of copending application Serial No. 678,430, filed August 15, 1957, now abandoned, in turn a continuation-in-part of application Serial No. 446,148, filed July 27, 1954, now abandoned.

This invention relates in general to the preparation of phosphine borines which have one or more halogen atoms bonded to the boron. The phosphine borines to which this invention is directed are those of the general formula $$RH_2P:BYY'Y''$$

wherein R is an aliphatic or aromatic radical and wherein Y, Y' and Y'' are hydrogen, aliphatic radicals, aromatic radicals or certain halogens, at least one of the said Y symbols representing one of these halogens, i.e., chlorine, bromine or iodine. Preferred compounds are those having the aforementioned general formula wherein R is an alkyl group of less than 13 carbon atoms, lower alkenyl, lower cycloalkyl, phenyl or lower alkyl-substituted phenyl and wherein Y, Y' and Y'' are either alkyl groups of less than 9 carbon atoms, phenyl or lower alkyl-substituted phenyl, at least one of symbols Y, Y' and Y'' representing chlorine, bromine or iodine, as aforementioned.

It is an object of this invention to provide for the preparation of phosphine borines having two hydrogen atoms bonded to the phosphorus and at least a single halogen bonded to the boron, which phosphine borines thereafter, in certain instances, may be converted to linear phosphinoborines or may be used directly as gasoline additives.

Further objects and advantages of this invention, if not specifically set forth, will become apparent during the course of the discussion which follows.

It has been found that phosphine borines having two hydrogens bonded to the phosphorus and one halogen atom other than fluorine bonded to the boron may be dehydrohalogenated to linear phosphinoborines in the presence of a tertiary amine at low temperatures (conveniently room temperature), thereby providing a method for the production of linear phosphinoborines which does not involve driving off all free hydrogens from the phosphorus and which does not result in disproportionation of a phosphine borine having hydrocarbon or halogen substituents bonded to the boron atom. These linear phosphinoborines find use as dielectrics, as set forth in copending application Serial No. 850,062, filed even date herewith, now Patent No. 3,012,076. Where more than a single halogen (other than fluorine) is bonded to the boron, the product is not particularly satisfactory as a starting material for the dehydrohalogenation reaction. However, the phosphine borines having more than a single halogen bonded to the boron may be used directly as preignition additives for gasoline. These phosphine borines combine the known beneficial effects of both phosphorus and boron in a single molecule of relatively small size and low molecular weight, but, unexpectedly, small amounts of these phosphine borines are found to be superior to mixtures of the individual commercially available preignition additives containing phosphorus on the one hand and boron on the other. Further, the phosphine borines are relatively non-reactive and resist decomposition, even at relatively high temperatures. In addition to the aforementioned utility as intermediates in the preparation of phosphinoborines, the monohalide phosphine borines may serve as gasoline preignition additives in the same fashion as the di- and trihalide adducts discussed above.

It is necessary that a halogen from the group chlorine, bromine and iodine, and excluding fluorine, be bonded to the boron atom if the phosphine borines are to be subjected to dehydrohalogenation. It is essential to the dehydrohalogenation process that a tertiary amine be used to remove the hydrohalogen acid which forms. But where fluorine is bonded to the boron, the HF acid which forms behaves entirely unlike the other hydrohalogen acids. Either it will not combine with a weak base or it combines so weakly as not to carry the reaction forward by forming an insoluble ternary ammonium salt. Therefore, the HF acid cannot be extracted from a P:B complex using a weak tertiary amine of the type suggested and stronger bases than the amines cannot be used since such materials as alkalis tend to displace the weaker phosphine base from the phosphine borine addition compound. Where the phosphine borines are to be used directly as preignition additives for gasoline, it is also undesirable that fluorine be bonded to the boron. The fluorine adducts are relatively unstable and hydrolyze more rapidly than do the adducts containing chlorine, bromine or iodine.

Broadly, to form the phosphine borine of this invention, a phosphine and a borine, or sources thereof, are placed in a reaction vessel in contact with each other. Under suitable temperature conditions, often as low as —110° C. and as high as room temperature, a reaction occurs between the phosphine and the borine with the phosphine borine being formed as the addition product. The reaction between the phosphine and the borine is carried out in the absence of moisture and in a non-oxidizing atmosphere. The reactor should first be flushed with nitrogen or similar inert gas, or be evacuated before the reactants are introduced.

Also, various of the B-halo phosphine borines may be prepared by reaction of a phosphine borine having at least a single hydrogen bonded to the boron and a hydrohalogen acid.

Generally speaking, the reactions described above are exothermic and tend to occur vigorously. The vigor of the reaction may be at least partially controlled by the use of suitable external cooling means, such as liquid nitrogen or a Dry Ice bath, by the use of suitable diluents which serve to prevent the temperature of the reaction from becoming unduly high and which may act as the solvent medium for the reaction, or by using both external cooling and a diluent. Obviously, however, the reaction is preferably carried out at a temperature as closely approaching room temperature as is feasible, the violence of the reaction being the limiting factor. However, as in laboratory work, where relatively fragile equipment is employed, low temperatures are preferred.

The reactor should be formed of a material which will resist the corrosive effects of the reactions and have sufficient strength to withstand the temperatures and pressures that may occur during the reaction; where the process is carried out on a small scale, a heat-resistant glass flask is suitable for use as a reactor.

EXAMPLE I

Dimethylbromoborine in the amount of 0.854 g. was placed in a 200 ml. round bottom flask which had been flushed with nitrogen. Diethyl ether in the amount of 60 ml. was added to the flask followed by 0.329 g. methylphosphine. Prior to the addition thereto of the phosphine material, the flask had been cooled to —78° C. The flask was allowed to warm sufficiently to initiate the reaction which then proceeded vigorously. The solvent was removed thereafter by distillation at reduced pressure and the product identified as methylphosphine dimethylbromoborine, $CH_3H_2P:B(CH_3)_2Br$.

Stoichiometry for runs similar to Example III is set forth in Table C below.

Table A

| Example No. | Phosphine | Quantity | Borine | Quantity | Solvent | Product |
|---|---|---|---|---|---|---|
| IV | $CH_3PH_2$ | 0.480 g | $(i-C_4H_9)_2BBr$ | 2.051 g | Diethyl ether | $H_2CH_3P:BBr(i-C_4H_9)_2$ |
| V | $C_2H_5PH_2$ | 0.102 g | $(C_2H_5)_2BBr$ | 0.244 g | ___do___ | $H_2C_2H_5P:BBr(C_2H_5)_2$ |
| VI | $CH_3PH_2$ | 80.3 cc | $(CH_3)_2BBr$ | 80.3 cc | ___do___ | $H_2CH_3P:BBr(CH_3)_2$ |
| VII | $p-CH_3C_6H_4PH_2$ | 0.637 g | $(CH_3)_2BBr$ | 0.854 g | Benzene | $p-CH_3C_6H_4H_2P:BBr(CH_3)_2$ |
| VIII | $CH_3PH_2$ | 1.240 g | $(CH_3)_2BBr$ | 3.450 g | Triethylene glycol dimethyl ether. | $H_2CH_3P:BBr(CH_3)_2$ |
| IX | $n-C_4H_9PH_2$ | 3.0 g | $(CH_3)_2BBr$ | 4.1 g | Diethyl ether | $n-C_4H_9H_2P:B(CH_3)_2Br$ |
| X | $CH_3PH_2$ | 0.397 g | $(n-C_3H_7)_2BCl$ | 1.094 g | ___do___ | $H_2CH_3P:B(n-C_3H_7)_2Cl$ |
| XI | $CH_3PH_2$ | 354.0 cc | $(CH_3)_2BBr$ | 353.3 cc | ___do___ | $H_2CH_3P:BBr(CH_3)_2$ |
| XII | $C_2H_5PH_2$ | 0.671 g | $(CH_3)_2BBr$ | 1.342 g | ___do___ | $H_2C_2H_5P:B(CH_3)_2Br$ |
| XIII | $CH_3PH_2$ | 0.289 g | $(n-C_4H_9)_2BBr$ | 1.236 g | Benzene | $H_2CH_3P:B(n-C_4H_9)_2Br$ |
| XIV | $C_6H_{11}PH_2$ | 0.587 g | $BBr_3$ | 1.271 g | Diethyl ether | $H_2C_6H_{11}P:BBr_3$ |
| XV | $C_6H_5PH_2$ | 0.608 g | $CH_3BBr_2$ | 1.030 g | ___do___ | $H_2C_6H_5P:BBr_2CH_3$ |
| XVI | $C_2H_5PH_2$ | 0.372 g | $BCl_3$ | 0.705 g | ___do___ | $H_2C_2H_5P:BCl_3$ |
| XVII | $CH_3PH_2$ | 0.528 g | $CH_3BCl_2$ | 1.067 g | ___do___ | $H_2CH_3P:BCl_2CH_3$ |
| XVIII | $n-C_3H_7PH_2$ | 0.076 g | $C_6H_5BI_2$ | 0.342 g | ___do___ | $n-C_3H_7H_2P:BC_6H_5I_2$ |
| XIX | $p-CH_3C_6H_4PH_2$ | 0.861 g | $BBr_3$ | 1.778 g | Benzene | $p-CH_3C_6H_4H_2P:BBr_3$ |
| XX | $i-C_5H_{11}PH_2$ | 0.936 g | $(C_8H_{17})_2BBr$ | 2.790 g | Diethyl ether | $i-C_5H_{11}H_2P:BBr(C_8H_{17})_2$ |
| XXI | $CH_3PH_2$ | 0.138 g | $p-CH_3C_6H_4BBr_2$ | 0.753 g | Benzene | $H_2CH_3P:B(p-CH_3C_6H_4)Br_2$ |

Table B

| Example No. | Phosphine | Quantity | Borane | Quantity | Solvent | Intermediate | HX | Quantity | Product |
|---|---|---|---|---|---|---|---|---|---|
| XXII | $CH_3PH_2$ | 0.624 g | $(CH_3)_2B_2H_4$ | 0.364 g | Diethyl ether. | $CH_3H_2P:BH_2CH_3$ | HCl | 0.475 g | $CH_3H_2P:BHClCH_3$ |
| XXIII | $CH_3PH_2$ | 32.1 cc | $B_2H_6$ | 16.0 cc | ___do___ | $CH_3H_2P:BH_3$ | HCl | 64.0 cc | $CH_3H_2P:BCl_2H$ |
| XXIV | $C_2H_5PH_2$ | 0.049 g | $(CH_3)_2B_2H_4$ | 0.022 g | ___do___ | $C_2H_5H_2P:BH_2CH_3$ | HBr | 0.065 g | $C_2H_5H_2P:BHBrCH_3$ |
| XXV | $C_3H_7PH_2$ | 20.1 cc | $B_2H_6$ | 10.0 cc | ___do___ | $C_3H_7H_2P:BH_3$ | HBr | 20.0 cc | $C_3H_7H_2P:BBrH_2$ |

Table C

| Example No. | Phosphine | Quantity | Borane | Quantity | Solvent | Chief product |
|---|---|---|---|---|---|---|
| XXVI | $C_6H_{11}PH_2$ | 1.610 g | $B_2H_5Br$ | 0.749 g | Diethyl ether | $H_2C_6H_{11}P:BBrH_2$ |
| XXVII | $C_2H_5PH_2$ | 0.318 g | $B_2H_5Br$ | 0.278 g | ___do___ | $H_2C_2H_5P:BBrH_2$ |
| XXVIII | $C_6H_5PH_2$ | 1.526 g | $B_2H_5Br$ | 0.749 g | ___do___ | $H_2C_6H_5P:BBrH_2$ |
| XXIX | $C_{12}H_{25}PH_2$ | 2.022 g | $B_2H_5Br$ | 0.534 g | ___do___ | $H_2C_{12}H_{25}P:BBrH_2$ |

EXAMPLE II

Butylphosphine dimethylchloroborine, $$n-C_4H_9H_2P:BCl(CH_3)_2$$

in the amount of 1.942 g. was prepared by treating butylphosphine dimethylborine with an equal molar quantity (1.173 mmoles) of HCl at −78° C. A 250 ml. round bottom flask which had been flushed with nitrogen was used. Diethyl ether in the amount of 50 ml. served as the solvent.

EXAMPLE III

Methylphosphine bromoborine, $CH_3H_2P:BBrH_2$, was prepared by placing 0.535 g. bromodiborane in a 200 ml. round bottom flask which had been flushed with nitrogen and cooled to −78° C. in a Dry Ice bath. Diethyl ether in the amount of 75 ml. was thereafter added and 0.480 g. methylphosphine run into the flask. The reaction mixture was allowed to warm slightly so as to initiate the reaction, thereby forming the desired compound in admixture with the byproduct methylphosphine borine.

Example I relates to a process involving the simple mixing of a phosphine and a borine and stoichiometry for additional such reactions is set forth in Table A below. Example II above relates to a process utilizing a halogen hydride and stoichiometry for additional such reactions is set forth in Table B below. Example III, which relates to a specific form of the mixing process, involves the utilization of bromodiborane as the borine.

In similar fashion, a wide variety of phosphine borines may be secured, all of which have only a single aliphatic or aromatic group bonded to the phosphorus atom and at least a single halogen other than fluorine bonded to the boron.

Obviously, many modifications and variations of the invention as hereinbefore set forth may be made without departing from the spirit and scope thereof, and therefore only such limitations should be imposed as are indicated in the appended claim.

We claim:

$H_2CH_3P:BCl_2CH_3$.

References Cited by the Examiner

UNITED STATES PATENTS 2,879,301  3/59  Stewart et al. _____ 260—606.5

OTHER REFERENCES

Hewitt et al.: Chemical Society Journal (1953), pages 530–534.

Wagner, R. I.: "Studies on Phosphorus and Sulphur Derivatives of Borine," Dept. of Chemistry, University of Southern California, February 1953.

LORRAINE A. WEINBERGER,
*Acting Primary Examiner.*

CHARLES B. PARKER, LEON ZITVER, *Examiners.*